Figure 1:
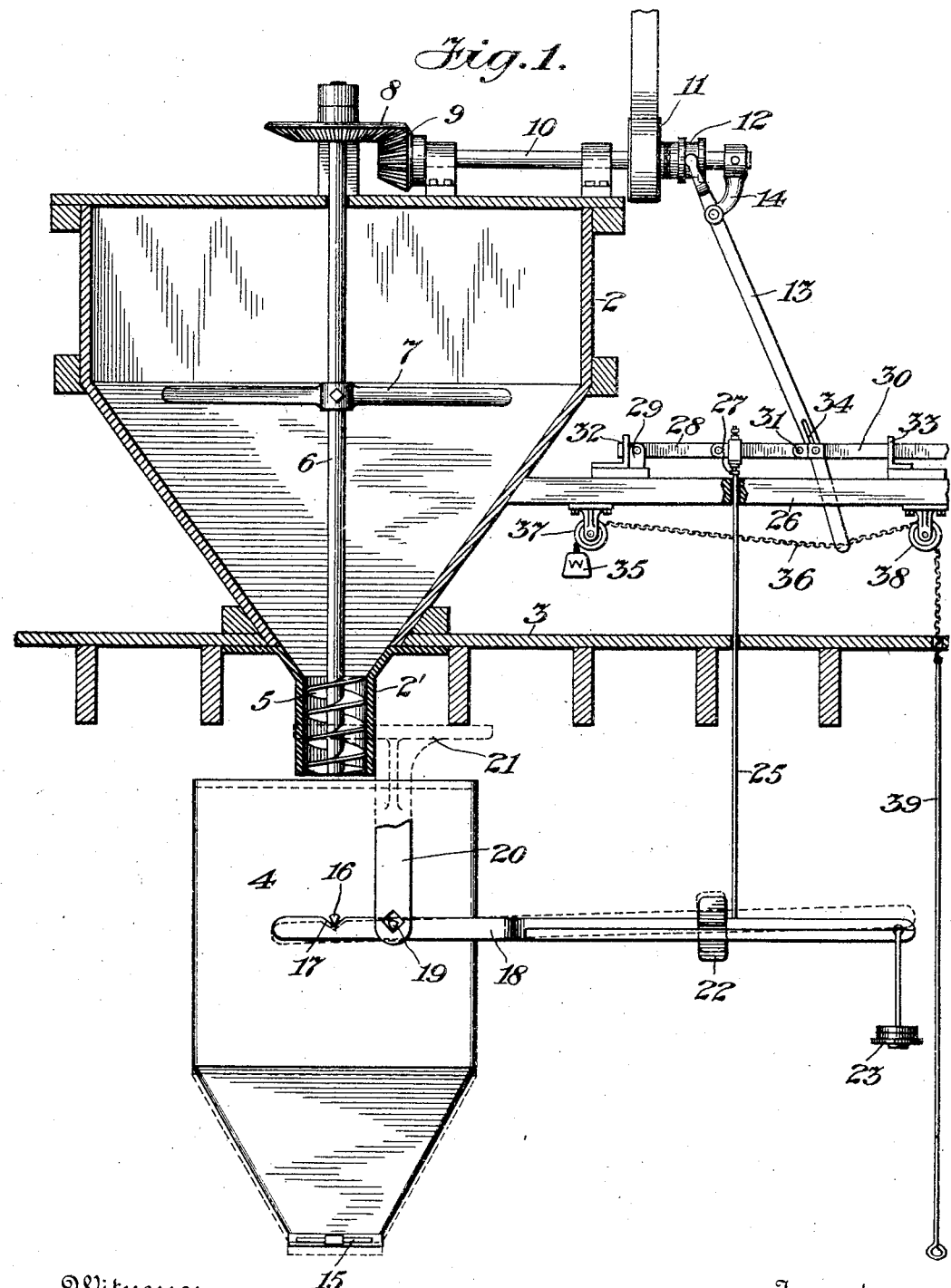

No. 779,649. PATENTED JAN. 10, 1905.
G. J. HICKS.
AUTOMATIC WEIGHING MACHINE.
APPLICATION FILED MAR. 9, 1903.

2 SHEETS—SHEET 1.

Witnesses
C. W. Smith
M. L. Forrest

Inventor
George J. Hicks
By his Attorney
Chas. F. Dane

No. 779,649. PATENTED JAN. 10, 1905.
G. J. HICKS.
AUTOMATIC WEIGHING MACHINE.
APPLICATION FILED MAR. 9, 1903.

2 SHEETS—SHEET 2.

Witnesses
O. W. Smith
M. L. Forrest

Inventor
George J. Hicks
By his Attorney
Chas. F. Dane

No. 779,649. Patented January 10, 1905.

UNITED STATES PATENT OFFICE.

GEORGE J. HICKS, OF ARDSLEY, NEW YORK.

AUTOMATIC WEIGHING-MACHINE.

SPECIFICATION forming part of Letters Patent No. 779,649, dated January 10, 1905.

Application filed March 9, 1903. Serial No. 146,838.

*To all whom it may concern:*

Be it known that I, GEORGE J. HICKS, a citizen of the United States, and a resident of Ardsley, in the county of Westchester and State of New York, have invented certain new and useful Improvements in Automatic Weighing-Machines, of which the following is a specification.

This invention relates to automatic weighing-machines for accurately determining quantities of material, and especially to a machine for automatically weighing at each operation a quantity of flour sufficient for the purpose of making when mixed and kneaded with the other usual ingredients a batch of dough for the production of a predetermined number of loaves of bread. This weighing of the flour before it is kneaded with the other ingredients in the dough serves to prevent the waste which occurs when the quantity of flour used for producing a given number of loaves of bread is not predetermined.

The main object of this invention is to provide a machine capable of weighing automatically a quantity of flour corresponding exactly to the amount necessary to make when mixed with the other ingredients a given number of loaves of bread. In order to accomplish this result, I make use of an automatic weighing mechanism in which flour is fed to a load-receiver or bucket by a supply device, the operation of which is stopped automatically at the proper moment to prevent the feeding of any more flour than is necessary to make up the exact predetermined weight.

One of the main features of the invention is the provision of means controlled by the descent of the load-receiver for automatically stopping the operation of the supply device at the proper moment, and I preferably employ for this purpose a toggle controlling a power-driven supply device or feeder and controlled in turn by the counterweighted scale-beam by which the load-receiver or bucket is carried, this toggle being shown supported independently of the weighing mechanism.

It is well known that flour, being made up of very fine particles, is extremely hard to feed, and in a weighing-machine adapted to weigh flour automatically it is necessary to employ a power-driven feeder or force-feed device for feeding the flour positively to the receiver or bucket, as flour will not flow properly out of an opening unless so fed.

For this reason I make use of a power-driven supply device, and another important feature of my invention is the automatic stopping of the operation of this device when the load-receiver descends to a predetermined point, the shutting off of the supply being controlled by mechanism governed by the descent of the bucket.

Other objects and advantages of the invention not hereinbefore described will be hereinafter referred to and are illustrated in the accompanying drawings, in which—

Figure 2:
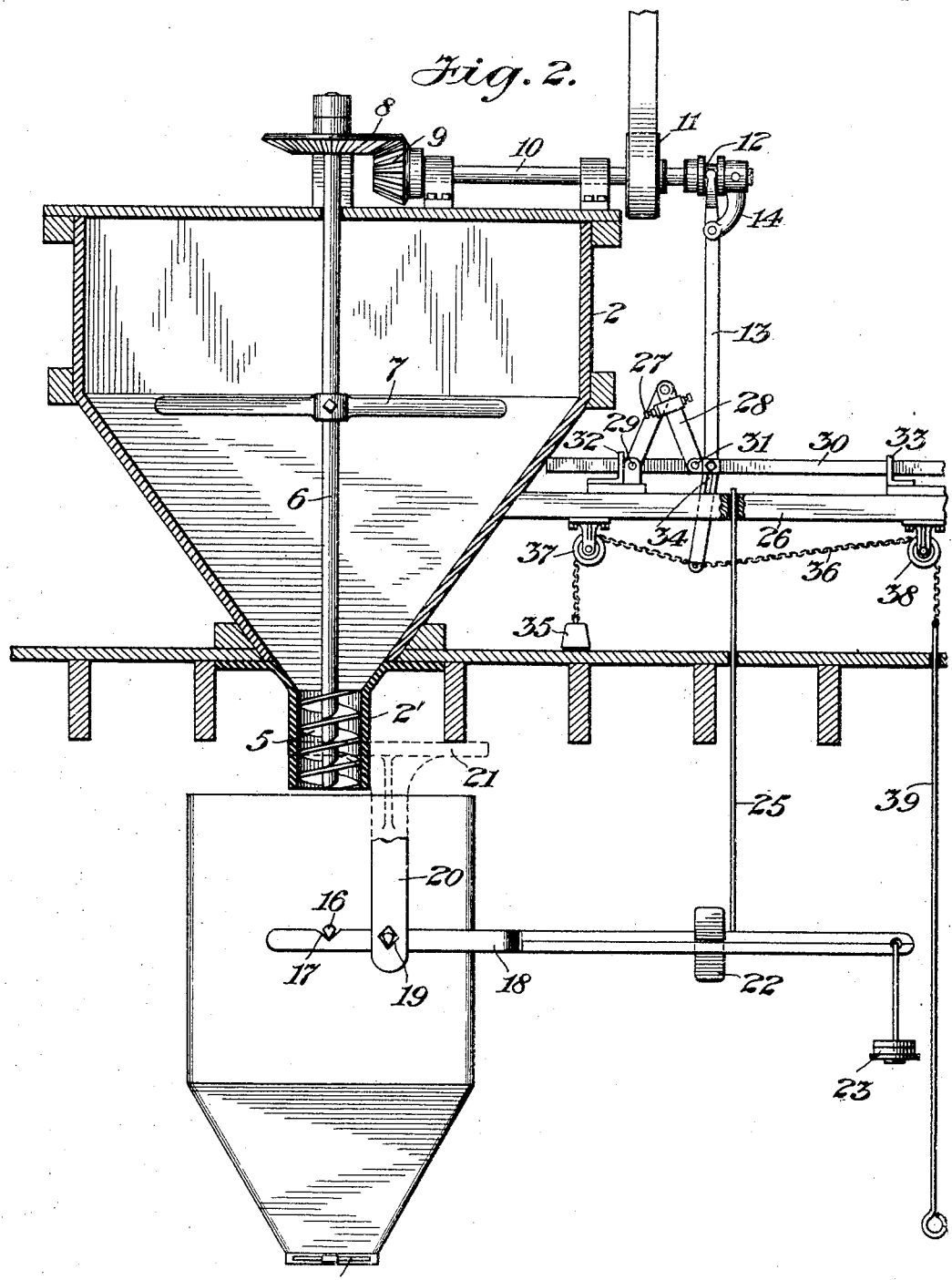

Figure 1 is a sectional side elevation of an automatic weighing-machine constructed in accordance with this invention, the parts being shown in position for operating the supply device or feeder and positively feeding flour to the load-receiver. Fig. 2 is a similar view showing the parts in the positions which they assume when the operation of the supply device or feeder is stopped.

In carrying my invention into effect it will be understood that flour to be weighed into charges of predetermined amount may be fed to the load-receiver or bucket of the weighing mechanism in any suitable manner, but will preferably be fed from a bin or hopper by means of a power device, the stopping of which is controlled automatically by the machine, whereas the starting of this device in operation will ordinarily be effected manually, as it is desirable in bakeries to separate the weighing and discharging functions of the mechanism and while performing the one automatically to permit the other to be determined manually, according to the requirements of the bakery. Ordinarily the flour will be contained in a large bin or hopper, such as 2, which may be kept filled in any suitable manner and the discharge end of which may extend down through the storage-floor 3 of the bakery and into a convenient position for supplying flour to the load-receiver or bucket of the weighing mechanism proper, such a receiver being shown at 4. The lower end of the bin or hopper 2 is in this case formed separately from the body of the bin, the major portion of it, as shown at 2', being perfectly cylindrical for the purpose of receiving a feed-screw, such as 5, constituting the main working element of the force-feeding means for positively conveying the flour in the bin to the bucket 4. In the construction shown the feed-screw 5 is secured to the lower end of a vertical shaft 6, mounted in a suitable bearing at the upper side of the bin 2 and preferably carrying stirring-arms 7 for agitating and loosening the mass of flour in the bin 2. The shaft 6 may be rotated in any well-known manner and by any suitable means, it having in this case at the upper end thereof a large bevel-gear 8, which meshes with and is driven by a bevel-pinion 9, secured to one end of a horizontal shaft 10, mounted in bearings at the upper side of the bin and carrying a driving-wheel 11, which normally turns loosely on the shaft 10 and is adapted to be clutched thereto to rotate such shaft. A clutch of any suitable construction, such as that shown at 12, may be employed to cause the band-wheel 11 to turn the shaft 10, and this clutch may be shifted into and out of working position by the usual clutch shipper or lever 13, pivoted on the bracket 14.

The load-receiver or bucket 4 of the automatic weighing mechanism may be of any suitable type, but preferably has a bottom closed by a sliding door, such as 15. At its opposite sides the load-receiver has knife-edged pivots 16, which coöperate with wide V-shaped bearings 17 in the upper sides of the arms of the forked scale-beam 18, the two forks of which also have knife-edged pivots 19 coöperating with corresponding bearings in suitable supports, such as hangers 20, depending from a top frame 21, which may be supported in any suitable way. The bucket 4 may be counterpoised in the usual manner by one or more counterweights, such as 22 and 23, regulable either in position or amount, to determine the amount of material to be weighed.

It will be evident from the foregoing description that the movement of the load-receiver and its scale-beam may be utilized to control the shutting off of the supply of material to such receiver, for when the weight or weights on the scale-beam are about poised by the load-receiver and its contents the bucket will begin to descend and will cause a corresponding ascent of the counterweighted end of the scale-beam. These movements of the bucket and its scale-beam in this construction are transmitted to the mechanism for stopping the operation of the power-driven feed device, and the means preferably employed by me is an automatic clutch-shipper actuator for shifting the shipping-lever 13 to its inoperative position. This actuator being controlled in turn by a releasing device governed directly by the scale-beam, it will be seen that through this series of connected parts the clutch-releasing movement is governed by the descent of the bucket to a predetermined point. In the construction shown a vertical rod 25, working in suitable guides, has its lower end in position to be operated by the counterweighted end of the scale-beam when the same ascends. Here the rod rests on the scale-beam and constitutes a follower which always moves with the beam, although this is not essential, it being merely necessary that the lower end of the rod be so positioned that the beam will force the rod up when the load-receiver arrives at the proper point in its descending movement. The rod shown passes through a guide-opening in the floor 3 and through a similar opening in a frame-piece 26 above said floor and at its upper end is positioned to coöperate with an adjustable stop 27, carried by a device for normally holding the clutch in the position shown in Fig. 1 during the feeding of the flour to the bucket. This holding device is shown as a toggle 28, one member of which is pivoted at a fixed point 29, while the other member of the toggle is pivoted to a slide 30 at the point 31. This slide is mounted in guides 32 and 33, which in this case are supported on the frame-piece 26, all of these parts just described being therefore mounted independently of the weighing mechanism. The slide 30 constitutes in this construction the means for holding the shipping-lever 13 in position to clutch the band-wheel 11 to the shaft 10 and cause the feed-screw 5 to turn. A pin-and-slot connection (designated by 34) is employed to pivot the shipping-lever to the slide.

It is important that the correctness of the weighing operation and the results attained shall not be vitiated by burdening the scale-beam or the load-receiver with unnecessary work, and in order to obtain the best results it is important to permit the scale-beam to perform only the operation of releasing the holding device or toggle 28 and to provide an independent actuator for accomplishing the actual shifting of the lever 13 and the slide 30, to which it is connected. Such an independent actuator is shown herein and consists of a weight 35, connected to a chain 36, passing over a pair of guide-pulleys 37 and 38, mounted in suitable bearings, the other end of the chain having attached thereto in this case a pull-rod 39. At a point between the pulleys 37 and 38 the chain 36 is fastened to the shipping-lever 13, which extends a considerable distance below the point of connection with the slide 30 in order that it may be readily connected to the chain.

It will be evident that when the parts are organized in the manner just described the operation of the weighing-machine will be as follows: It being understood that the parts are in the position shown in Fig. 1, with the screw 5 turning in the spout of the hopper or bin 2, the flour or other material will be forcibly fed into the receiver 4, and the flour will continue to be supplied until the bucket descends to a point at or slightly below the poising-line of the scale-beam, when the rod 25, which is raised by the counterweighted end of the scale-beam as the bucket descends, will overcome the slight resistance of the members of the toggle 28 and will strike said toggle, because of its upward thrust against the stop 27, when the weight 35 will immediately become effective to shift the lower end of the shipping-lever 13 to the left and with it the slide 30 and the movable end of the toggle, whereupon the clutch 12 will be at once released from the driving-wheel 11, and the rotation of the shaft 10 and the connections to the feed-screw 5 will immediately stop. The parts will now be in the positions shown in Fig. 2 and will remain in such positions until the bucket 4 is emptied by opening the door 15 and permitting the flour to flow out into a suitable receptacle or trough. After the bucket is emptied and the sliding door 15 closed again the parts will remain in the position shown in Fig. 2 until it is desired to weigh another charge, when the band-wheel 11 may be clutched to the shaft 10 again by pulling down on the rod 39. By means of this rod and its connections, before described, the shipping-lever 13 may be shifted to the right to the position shown in Fig. 1 and with it the slide 30, and the toggle 28 may be straightened again to resist the pull of the weight 35 until the toggle is again struck by the rod 25. The connections from the pull-rod 39 therefore constitute a manually-operated starting device for starting the weighing operation normally at the will of the attendant, while the other parts heretofore described automatically determine the shutting off of the supply as soon as the bucket contains the proper weight.

What I claim is—

1. In an automatic weighing-machine, the combination with a power-driven supply device, of a counterpoised load-receiver, a toggle controlling the operation of said supply device, and a toggle-striking device independent of the toggle controlled by the descent of the load-receiver.

2. In an automatic weighing-machine, the combination with a power-driven supply device, of a counterpoised load-receiver, a toggle controlling the operation of said supply device, a toggle-striking device controlled by the descent of the load-receiver, and an adjustable contact between the toggle and the toggle-striking device.

3. In an automatic weighing-machine, the combination with a supply device, of a counterpoised load-receiver, a toggle mounted independently of the load-receiver and controlling the operation of said supply device, a toggle-striking rod controlled by the descent of the load-receiver, and guiding means for said rod.

4. In an automatic weighing-machine, the combination with a power-driven supply device, of a counterpoised load-receiver, a clutch controlling the operation of said supply device, a slide, a clutch-shipper connected to said slide, an automatic clutch-shipper actuator, a toggle connected at one end to said slide, and a toggle-striking device controlled by the descent of the load-receiver.

5. In an automatic weighing-machine, the combination with a power-driven supply device, of a counterpoised load-receiver, a clutch controlling the operation of said supply device, a clutch-lever, a clutch-controlling toggle mounted independently of the load-receiver and connected with said clutch-lever, a toggle-striking device controlled by the descent of the load-receiver, an automatic clutch-actuator, a manually-operated starting device also controlling the operation of the clutch, and a flexible medium connecting the said automatic clutch-actuator and the manually-operated starting device with the said clutch-lever.

Signed at New York, in the county of New York and State of New York, this 29th day of November, A. D. 1902.

GEORGE J. HICKS.

Witnesses:
 CHAS. F. DANE,
 M. L. FORREST.